United States Patent [19]

Mori et al.

[11] Patent Number: 4,537,691

[45] Date of Patent: Aug. 27, 1985

[54] SILICONE-BASED WORKING FLUID COMPOSITION

[75] Inventors: Shigeru Mori, Gunma; Yoshiaki Kudo, Tokyo; Satoshi Kuwata, Gunma, all of Japan

[73] Assignee: Shin-Etsu Chemical Co. Ltd., Tokyo, Japan

[21] Appl. No.: 667,535

[22] Filed: Nov. 2, 1984

[30] Foreign Application Priority Data

Nov. 14, 1983 [JP] Japan .................................. 58-213474

[51] Int. Cl.$^3$ ............................................... C10M 3/46
[52] U.S. Cl. .................... 252/49.6; 252/78.3; 528/28; 528/38; 528/41; 528/901
[58] Field of Search ................ 252/49.6, 78.3; 528/28, 528/32, 38, 41, 901

[56] References Cited

U.S. PATENT DOCUMENTS

| | | | |
|---|---|---|---|
| 3,344,066 | 9/1967 | Schiefer et al. | 252/49.6 |
| 3,378,521 | 4/1968 | Boslick | 528/28 |
| 3,532,730 | 10/1970 | Culpepper | 252/49.6 |
| 4,221,896 | 9/1980 | Endo | 528/28 |
| 4,496,696 | 1/1985 | Kurita | 528/28 |

Primary Examiner—Jacqueline V. Howard
Attorney, Agent, or Firm—Toren, McGeady, Stanger, Goldberg & Kiel

[57] ABSTRACT

The invention provides a silicone-based working fluid composition having improved heat resistance which comprises (A) 100 parts by weight of a base component composed of a first dimethylpolysiloxane terminated at both molecular chain ends each with a trimethylsiloxy group and a second dimethylpolysiloxane terminated at both molecular chain ends each with a silicon-bonded hydroxy group in such a proportion that the trimethylsiloxy/hydroxy molar ratio is from 95/5 to 10/90 and (B) from 0.01 to 5 parts by weight of an additive component which is a diorganopolysiloxane having imino-containing phenoxy groups, e.g. 4-anilinophenoxy group, 4-(4-anilino)anilinophenoxy group, 4-($\alpha$-naphthylamino)phenoxy group and 4-($\beta$-naphthylamino)-phenoxy group, as the pendant groups on the polysiloxane.

3 Claims, No Drawings

SILICONE-BASED WORKING FLUID COMPOSITION

BACKGROUND OF THE INVENTION

The present invention relates to a silicone-based working fluid composition or, more particularly, to a working fluid composition comprising organopolysiloxanes and capable of being used in a hermetically sealed condition at high temperatures which can be used also as a base oil for the preparation of a silicone grease.

It may be too much to say that silicone fluids are much superior in respect of the heat resistance to conventional mineral oils as well as oils originating in animals and plants. Even these silicone fluids are not safe from oxidation when exposed to a high temperature atmosphere at 200° C. or higher resulting in gradual degradation of the quality so that it is eagerly desired to develop a silicone fluid composition usable as a lubricating oil or a working fluid at high temperatures with sufficient durability or serviceable life.

Of course, various proposals and attempts have been made to provide a means for significantly improving the heat resistance of silicone fluids. For example, U.S. Pat. No. 3,328,350 discloses a method in which a silicone fluid is admixed with an organopolysiloxane having specific aromatic-substituted amino groups as the pendant groups on the polysiloxane to be imparted with improved heat resistance. The silicone fluid composition described there can indeed exhibit excellent heat resistance under a condition of good contacting with atmospheric air but the effect of preventing viscosity decrease at high temperatures is rather poor when the fluid composition is under a hermetically sealed or semi-sealed condition without free contacting with air.

SUMMARY OF THE INVENTION

It is therefore an object of the present invention to provide a novel silicone fluid composition usable as a working fluid at high temperatures even in a hermetically sealed condition without viscosity decrease over a long period of time.

Thus, the silicone-based working fluid composition of the present invention comprises:

(A) 100 parts by weight of a diorganopolysiloxane or a mixture of diorganopolysiloxanes each represented by the general formula $$R^1-SiR^2_2-O)_mSiR^2_2-R^1, \quad (I)$$

in which each $R^1$ is a trihydrocarbylsiloxy group or a hydroxy group independently from the other, $R^2$ is an alkyl group or a phenyl group and m is a positive integer in the range from 20 to 2000, the groups denoted by $R^1$ in the overall component (A) being a combination of trihydrocarbylsiloxy groups and hydroxy groups in such a molar proportion of the former to the latter in the range from 95/5 to 10/90, and (B) from 0.01 to 5 parts by weight of an organopolysiloxane represented by the general formula $$R^3-SiR^2_2-O)_nSiR^2_2-R^3 \quad (II)$$

or

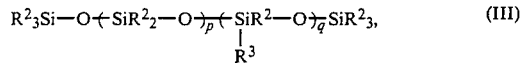

in which $R^2$ has the same meaning as defined above, $R^3$ is an imino-substituted phenoxy group selected from the class consisting of 4-anilinophenoxy group, 4-(4-anilino)anilinophenoxy group, 4-(α-naphthylamino)-phenoxy group and 4-(β-naphthylamino)phenoxy group, n is a positive integer in the range from 1 to 50, q is a positive integer in the range from 1 to 10 and p is zero or a positive integer with the proviso that p+q is in the range from 1 to 48.

DETAILED DESCRIPTION OF THE PREFERRED EMBODIMENTS

As is described in the above, the principal component, i.e. component (A), in the inventive silicone-based working fluid composition is a diorganopolysiloxane or a combination of diorganopolysiloxanes each represented by the general formula (I). In the formula, the symbol $R^2$ denotes an alkyl group or a phenyl group and suitable alkyl groups are exemplified by methyl, ethyl, propyl and decyl groups as well as halogen substituted alkyl groups such as 3,3,3-trifluoropropyl group. It is preferable that at least 50% by moles of all of the groups $R^1$ in the component (A) should be methyl groups. The suffix m in the formula (I) is a positive integer in the range from 20 to 2000 inclusive or, preferably, from 100 to 1000 inclusive in order that the resultant fluid composition may have a viscosity suitable as a working fluid.

The symbol $R^1$ in the formula denotes a trihydrocarbylsiloxy group which is typically a trimethylsiloxy group or a hydroxy group. Characteristically, the groups $R^1$ in the component (A) cannot be all the trimethylsiloxy groups or all the hydroxy groups but the component (A) should contain the terminal groups $R^1$ as a combination of trimethylsiloxy groups and hydroxy groups in a limited molar proportion from 95/5 to 10/90. Such a requirement for the molar proportion of the trimethylsiloxy groups to hydroxy groups can of course be satisfied when each of the molecules constituting the component (A) has one trimethylsiloxy terminal group and one hydroxy terminal group giving the molar ratio of 50/50.

Instead of using the above mentioned trimethylsiloxy/hydroxy-terminated diorganopolysiloxane alone as the component (A), the component (A) can be a mixture of two types of diorganopolysiloxanes of which one is a diorganopolysiloxane terminated at both molecular chain ends each with a trimethylsiloxy group and the other is a diorganopolysiloxane terminated at both molecular chain ends each with a hydroxy group in such a molar proportion that the above specified requirement for the trimethylsiloxy/hydroxy molar ratio is satisfied. It is of course optional that the component (A) is a ternary mixture composed of the trimethylsiloxy-, hydroxy- and trimethylsiloxy/hydroxy-terminated diorganopolysiloxanes. When this molar ratio is larger than 95/5, the working fluid composition may exhibit an undesirably large viscosity decrease under heating in a hermetically sealed condition while a working fluid composition of which this molar ratio is smaller than 10/90 exhibits a viscosity increase under heating in a hermetically sealed condition.

Each of the above described three types of the diorganopolysiloxanes or, typically, dimethylpolysiloxanes can be synthesized according to a known method. For example, the trimethylsiloxy-terminated dimethylpolysiloxane, i.e. a diorganopolysiloxane of the general formula (I) of which each of the terminal groups $R^1$ is a trimethylsiloxy group and all of the groups denoted by $R^2$ are methyl groups, can be obtained by the equilibration reaction of octamethylcyclotetrasiloxane and a linear trimethylsiloxy-terminated low-molecular dimethylpolysiloxane such as decamethyl tetrasiloxane mixed in a suitable proportion with agitation at an elevated temperature of, for example, 150° C., under an atmosphere of nitrogen gas in the presence of potassium hydroxide as the catalyst followed by neutralization of the catalyst with tricresyl phosphate, removal of the precipitated salt by filtration and stripping of the volatile matter.

The hydroxy-terminated dimethylpolysiloxane, i.e. a diorganopolysiloxane of the general formula (I) of which each of the terminal groups $R^1$ is a hydroxy group and all of the groups denoted by $R^2$ are methyl groups can be obtained by the potassium hydroxide-catalyzed polymerization of, for example, octamethylcyclotetrasiloxane admixed with a small but controlled amount of water in an autoclave at an elevated temperature.

Further, the trimethylsiloxy/hydroxy-terminated dimethylpolysiloxane, i.e. a diorganopolysiloxane of which one of the terminal groups $R^1$ is a trimethylsiloxy and the other is a hydroxy group and all of the groups denoted by $R^2$ are methyl groups, can be obtained by the simultaneous equilibration reaction and hydroxylation reaction of a mixture of octamethylcyclotetrasiloxane, decamethyl tetrasiloxane and water in the presence of potassium hydroxide as the catalyst performed in an autoclave at an elevated temperature. Alternatively, such a trimethylsiloxy/hydroxy-terminated dimethylpolysiloxane can be obtained by the partial silylation of a hydroxy-terminated dimethylpolysiloxane by heating thereof with admixture of a silylating agent such as dimethylamino trimethyl silane, diethylamino trimethyl silane, hexamethyl disilazane and the like followed by stripping under reduced pressure to remove volatile matters.

The component (B) is a diorganopolysiloxane having at least one imino-substituted phenoxy group as the pendant on the polysiloxane structure and represented by the general formula (II) or (III). The imino-substituted phenoxy group is selected from the class consisting of 4-anilinophenoxy group, 4-(4-anilino)anilinophenoxy group, 4-(α-naphthylamino)phenoxy group and 4-(β-naphthylamino)phenoxy group. The degree of polymerization, i.e. the number of silicon atoms in a molecule, of the organopolysiloxane as the component (B) should not be too large and not exceed the upper limit defined by the limitations given for the suffix n or the summation of p+q. When the organopolysiloxane as the component (B) has an excessively large degree of polymerization, the amount of admixture with the component (A) should be increased so much to cause practical disadvantages in order to obtain desired effects of oxidation prevention. When the suffix q in the general formula (III) is larger than 10, the diorganopolysiloxane having imino-substituted phenoxy groups may have less miscibility with the component (A) so that uniform working fluid composition can hardly be obtained.

The diorganopolysiloxane as the component (B) can be prepared by the reaction of a diorganopolysiloxane having at least one silicon-bonded reactive group, e.g. silicon-bonded chlorine atom, in a molecule with an aminophenol compound such as 4-anilinophenol, 4-(4-anilino)anilinophenol, 4-(α-naphtylamino)phenol and 4-(β-naphthylamino)phenol, corresponding to 4-anilinophenoxy group, 4-(4-anilino)anilino-phenoxy group, 4-(α-naphthylamino)phenoxy group and 4-(β-naphthylamino)phenoxy group, respectively, in a toluene solution at room temperature or at an elevated temperature with agitation in the presence of an acceptor for hydrogen chloride such as pyridine, triethylamine and the like followed by the removal of the precipitated hydrochloride by filtration and stripping at an elevated temperature under reduced pressure to remove volatile matters.

The silicone-based working fluid composition of the present invention can be obtained by merely blending the above described component (A) and (B) uniformly. The amount of the component (B) blended with the component (A) should be in the range from 0.01 to 5 parts by weight per 100 parts by weight of the component (A). When the amount of the component (B) is too small, no desired effect of heat-resistance improvement can naturally be obtained while an excessively large amount of addition thereof over 5 parts by weight per 100 parts by weight of the component (A) has no further additional advantage rather with an economical disadvantage due to the relative expensiveness of the component (B). In order to ensure uniformity of blending of these two components, the procedure may be performed at an elevated temperature or by blowing a gas such as air into the mixture although it is more preferable to perform the blending procedure in an atmosphere of an inert gas such as nitrogen.

The silicone-based fluid composition obtained in the above described manner can of course be used as such as a working fluid although it is optional that conventional additives used in working fluid compositions are added according to need. In particular, it is preferable when the fluid composition is used as a base oil of a silicone grease for high temperature use that additives such as oiliness improvers, extreme pressure additives, coloring agents and the like are added thereto.

In the following, the silicone-based working fluid composition of the present invention is described in further detail by way of examples, in which the expression of "parts" refers to "parts by weight" in each occurrence and the viscosities are given by the values obtained in the measurement at 25° C. The sample Me in the following denotes a methyl group. In the examples, the results of the heat-resistance test and durability test were obtained according to the following testing procedures.

(1) STATIC HEAT-RESISTANCE TEST

A 30 g portion of the fluid composition under testing was taken in a thoroughly cleaned hard glass ampule of 50 ml capacity and the ampule sealed off was kept for 24 hours or 72 hours in a thermostatted air oven at 250° C. The viscosity of the fluid composition was determined before and after the above heating procedure.

(2) DURABILITY TEST AS A WORKING FLUID IN A FAN COUPLING

An automobile fan coupling was filled with 10 g of the fluid composition under testing and mounted on a fan coupling testing machine after connecting an 8-blade fan. The fan coupling was driven at 7500 rpm and the output revolution of the fan was determined after 20 hours of continuous operation.

EXAMPLE 1

A mixture of polydimethylsiloxanes was prepared by blending 70 parts of a first dimethylpolysiloxane terminated at both molecular chain ends each with a trimethylsiloxy group and having a viscosity of 4850 centistokes and 30 parts of a second dimethylpolysiloxane terminated at both molecular chain ends each with a hydroxydimethylsiloxy group and having a viscosity of 5380 centistokes. The molar ratio of the terminal trimethylsiloxy groups in the former and the terminal silanolic hydroxy groups in the latter was about 70/30.

A silicone fluid composition usable as a working fluid, which is referred to as Composition No. 1, was prepared by uniformly blending 100 parts of the above prepared mixture of the dimethylpolysiloxanes and 1.2 parts of a dimethylpolysiloxane expressed by the formula $$R^3(SiMe_2\text{-}O)_6\text{-}SiMe_2\text{-}R^3,$$

in which $R^3$ is a 4-anilinophenoxy group.

Another working fluid composition, referred to as Composition No. 2, was prepared by blending each 50 parts of the same trimethylsiloxy-terminated and silanolic hydroxy-terminated dimethylpolysiloxanes as used in the preparation of the Composition No. 1 to give the trimethylsiloxy/hydroxy ratio of 50/50 and 0.1 part of a 4-($\beta$-naphthylamino)phenoxy-containing diorganopolysiloxane expressed by the formula $$Me_3Si\text{---}O\text{+}SiMe_2\text{---}O\text{+}_{72}\text{+}SiMe\text{---}O\text{+}_{3}SiMe_3,$$
$$|$$
$$R^3$$

in which $R^3$ is a 4-($\beta$-naphthylamino)phenoxy group.

In addition, two comparative silicone fluid compositions, referred to as Compositions No. 3 and No. 4, were prepared each by blending 100 parts of the same trimethylsiloxy-terminated dimethylpolysiloxane alone or the same hydroxy-terminated dimethylpolysiloxane alone, respectively, as used in the preparation of the Compositions No. 1 and No. 2 and 1.2 parts of the same 4-($\beta$-naphthylaino)phenoxy-containing diorganopolysiloxano as used in the preparation of the Composition No. 2.

These 4 silicone fluid compositions No. 1 to No. 4 were subjected to the evaluation of the performance as a working fluid to give the results shown in Table 1 below.

EXAMPLE 2

A silicone fluid composition, referred to as Composition No. 5, was prepared by uniformly blending 100 parts of a dimethylpolysiloxane mixture having a viscosity of 4800 centistokes and composed of a trimethylsiloxy-terminated dimethylpolysiloxane and a hydroxy-terminated one in a proportion to give the trimethylsiloxy/hydroxy ratio of 83/17 and 0.02 part of a dimethylpolysiloxane terminated at both molecular chain ends each with a 4-(4-anilino)anilinophenoxy group expressed by the formula
$$R^3\text{---}SiMe_2\text{-}O)_6SiMe_2\text{-}R^3,$$

in which $R^3$ is a 4-(4-anilino)anilinophenoxy group. This silicone fluid composition was subjected to the test as a working fluid to give the results shown in Table 1.

EXAMPLE 3

A silicone fluid composition, referred to as Composition No. 6, was prepared by uniformly blending 100 parts of a dimethylpolysiloxane mixture having a viscosity of 4950 centistokes and composed of 20 parts of a trimethylsiloxy-terminated dimethylpolysiloxane and 80 parts of a silanolic hydroxy-terminated dimethylpolysiloxane to give a trimethylsiloxy/hydroxy molar ratio of 20/80 and 0.1 part of the same 4-(4-anilino)anilinophenoxy-terminated dimethylpolysiloxane as used in the preparation of the Composition No. 5. This silicone fluid composition was subjected to the test as a working fluid to give the results shown in Table 1.

EXAMPLE 4

A silicone fluid composition, referred to as Composition No. 7, was prepared by uniformly blending 100 parts of a dimethylpolysiloxane mixture having a viscosity of 5050 centistokes and composed of 45 parts of a trimethylsiloxy-terminated dimethylpolysiloxane and 55 parts of a silanolic hydroxy-terminated dimethylpolysiloxane to give a trimethylsiloxy/hydroxy molar ratio of 45/55 and 2.0 parts of the same 4-anilinophenoxy-terminated dimethylpolysiloxane as used in the preparation of the Composition No. 1. This silicone fluid composition was subjected to the test as a working fluid to give the results shown in Table 1.

TABLE 1

| Composition No. | Static heat resistance test, ratio of viscosities after and before heating at 250° C. for | | Fan coupling test, revolution of fan, r.p.m. |
|---|---|---|---|
| | 24 hours | 72 hours | |
| 1 | 0.95 | 0.74 | 2,320 |
| 2 | 0.98 | 0.82 | 2,420 |
| 3 | 0.69 | 0.41 | 1,950 |
| 4 | 1.18 | 1.45 | Gelling of fluid |
| 5 | 0.90 | 0.72 | 2,360 |
| 6 | 0.98 | 0.88 | 2,450 |
| 7 | 0.92 | 0.82 | 2,430 |

What is claimed is:

1. A silicone-based working fluid composition which comprises:
(A) 100 parts by weight of a diorganopolysiloxane or a mixture of diorganopolysiloxanes each represented by the general formula $$R^1\text{---}SiR^2{}_2\text{-}O)_m SiR^2{}_2\text{-}R^1,$$

in which each $R^1$ is trihydrocarbylsiloxy group or a hydroxy group independently from the other, $R^2$ is an alkyl group or a phenyl group and m is a positive integer in the range from 20 to 2000, the groups denoted by $R^1$ in the overall component (A) being a combination of trihydrocarbylsiloxy groups and hydroxy groups in such a molar proportion of the former to the latter in the range from 95/5 to 10/90, and
(B) from 0.01 to 5 parts by weight of an organopolysiloxane represented by the general formula $$R^3\text{---}SiR^2{}_2\text{-}O)_n SiR^2\text{-}R^3$$

or

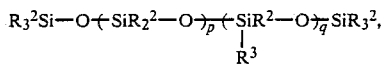

in which $R^2$ has the same meaning as defined above, $R^3$ is an imino-substituted phenoxy group selected from the class consisting of 4-anilinophenoxy group, 4-(4-anilino)anilinophenoxy group, 4-($\alpha$-naphthylamino)phenoxy group and 4-($\beta$-naphthylamino)phenoxy group, n is a positive integer in the range from 1 to 50, q is a positive integer in the range from 1 to 10 and p is zero or a positive integer with the proviso that p+q is in the range from 1 to 48.

2. The silicone-based working fluid composition as claimed in claim 1 wherein at least 50% by moles of the groups denoted by $R^2$ are methyl groups.

3. The silicone-based working fluid composition as claimed in claim 1 wherein the component (A) is a mixture of a first dimethylpolysiloxane terminated at both molecular chain ends each with a trimethylsiloxy group and a second dimethylpolysiloxane terminated at both molecular chain ends each with a dimethylhydroxysiloxy group.

* * * * *